US007620306B2

(12) United States Patent
Santo et al.

(10) Patent No.: US 7,620,306 B2
(45) Date of Patent: Nov. 17, 2009

(54) LENS BARREL AND IMAGING DEVICE

(75) Inventors: Takeo Santo, Osaka (JP); Keiji Sakamoto, Osaka (JP); Keishi Iwasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 11/660,314

(22) PCT Filed: Jul. 13, 2006

(86) PCT No.: PCT/JP2006/013949

§ 371 (c)(1),
(2), (4) Date: Feb. 15, 2007

(87) PCT Pub. No.: WO2007/010814

PCT Pub. Date: Jan. 25, 2007

(65) Prior Publication Data
US 2007/0253690 A1    Nov. 1, 2007

(30) Foreign Application Priority Data
Jul. 15, 2005    (JP)    ............................ 2005-207156

(51) Int. Cl.
G03B 17/00    (2006.01)
G02B 15/02    (2006.01)
G02B 15/14    (2006.01)

(52) U.S. Cl. .................. 396/85; 359/676; 359/700
(58) Field of Classification Search ............. 396/142, 396/478, 91, 85, 72; 359/676, 699–701
See application file for complete search history.

(56) References Cited

U.S. PATENT DOCUMENTS 5,818,647 A * 10/1998 Nishio et al. ................ 359/700
5,912,772 A * 6/1999 Aoki .......................... 359/701
6,195,212 B1 * 2/2001 Miyamoto .................. 359/699
6,867,926 B2 * 3/2005 Iikawa et al. ................ 359/701
6,873,472 B2 * 3/2005 Suzuki ....................... 359/699
6,954,314 B2 * 10/2005 Nomura et al. ............. 359/700
7,401,987 B2 * 7/2008 Sato ........................... 396/529
7,408,722 B2 * 8/2008 Ishizuka et al. ............. 359/701
7,499,637 B2 * 3/2009 Ishizuka et al. .............. 396/79
2001/0005288 A1 * 6/2001 Hayashi et al. ............. 359/826

(Continued)

FOREIGN PATENT DOCUMENTS

JP    7-191249 A    7/1995

(Continued)

*Primary Examiner*—Rochelle-Ann J Blackman
(74) *Attorney, Agent, or Firm*—McDermott Will & Emery LLP

(57) ABSTRACT

A lens barrel 11 is mounted to a collapsible imaging device 1 having a zooming function and includes a cam frame 19, a first lens frame 39, a second lens frame 45, and a third lens frame 55. First, second, and third lens frame cam grooves 25, 27, 29, respectively including in the longitudinal direction thereof insertion parts 25a, 27a, 29a, collapse parts 25b, 27b, 29b, and variable power parts 25c, 27c, 29c are formed in the inner peripheral face of the cam frame 19. The third lens frame cam groove 29 are deeper than the first and second lens frame cam grooves 25, 27 and are intersected at the collapse parts 29c thereof with the respective insertion parts 25a, 27a.

7 Claims, 15 Drawing Sheets

U.S. PATENT DOCUMENTS

| | | | |
|---|---|---|---|
| 2004/0228006 A1* | 11/2004 | Yasutomi et al. | 359/699 |
| 2006/0045503 A1* | 3/2006 | Ishizuka et al. | 396/79 |
| 2006/0139777 A1* | 6/2006 | Yasuda | 359/819 |

FOREIGN PATENT DOCUMENTS

| | | | |
|---|---|---|---|
| JP | 10-282394 A | 10/1998 |
| JP | 2001-235672 A | 8/2001 |
| JP | 2004-258642 A | 9/2004 |
| JP | 2005-172953 A | 6/2005 |

* cited by examiner (a)

(b)

(a)

(b)

LENS BARREL AND IMAGING DEVICE

RELATED APPLICATION

This application is the U.S. National Phase under 35 U.S.C. § 371 of International Application No. PCT/JP2006/313949, filed on Jul. 13, 2006, which claims priority of JP 2005-207156, filed on Jul. 15, 2005, the disclosures of which Application is incorporated by reference herein.

TECHNICAL FIELD

The present invention relates to a lens barrel and an imaging device including the lens barrel, and particularly relates to a lens barrel extended from an image plane side to an object side in shooting and an imaging device including the lanes barrel.

BACKGROUND ART

Particularly in recent years, percentages of home with digital still cameras (hereinafter referred to as DSCs) or digital video cameras increase, and DSCs and compact DSCs having an image stabilizing functions are developed for contemplating an increase in convenience.

For example, Patent Document 1 discloses a zoom lens barrel (lens barrel) which is compacted by devising the arrangement of cams (cam grooves) in a cam frame. Specifically, the document discloses that bottomed cams are provided on both of the inner peripheral face and the outer peripheral face of the cam frame, the cam on the inner peripheral face and the cam on the outer peripheral face are arranged so as to cross each other at least one position, and one come groove is formed so as to be divided at at least one position, thereby achieving an efficient arrangement of the cams in a small space to minimize the dimension of the cam frame in the direction of the optical axis. As a result, a zoom lens barrel is reduced in size.

Patent Document 1: Japanese Patent Application Laid Open Publication No. 7-191249A

SUMMARY OF THE INVENTION

Problems that the Invention is to Solve

In the zoom lens barrel disclosed in Patent Document 1, however, the cams are provided on the inner peripheral face and the outer peripheral face of the cam frame, which complicates much the structure of the cams in the cam frame.

In addition, four kinds of cams are formed on the inner peripheral face of the cam frame, resulting in intersection with one another. This may inhibit the cam pins mounted to the lens frame from sliding in the cam smoothly or derail the cam pins from the cams.

The present invention has been made in view of the foregoing and has its object of providing a lens barrel in which a cam groove structure in the cam frame is simplified and which can inhibit the lens frame and the like from derailing in use, and of providing an image device including the lens barrel.

Means for Solving the Problems

A lens barrel according to the present invention is a lens barrel having a zooming function which includes: a cylindrical cam frame which is capable of moving along a direction of an optical axis and which includes an inner peripheral face in which a plurality of cam grooves are formed; and a plurality of lens frames arranged inside the cam frame with a longitudinal direction thereof aligned with that of the cam frame. Wherein the plurality of lens frame are formed so as to receive lenses so that the lenses are arranged and mounted in the cam frame with optical axes thereof aligned with each other, and the plurality of lens frames include cam pins capable of being engaged with the plurality of cam grooves. Each of the plurality of cam grooves includes in a longitudinal direction thereof: an insertion part formed so that a corresponding cam pin is movable in the longitudinal direction thereof while being engaged therewith when the plurality of lens frames are inserted in the cam frame; a collapse part formed so that a corresponding cam pin is movable in the longitudinal direction thereof while being engaged therewith when the plurality of lens frames move in the direction of the optical axis; and a variable power part formed so that a corresponding cam pin is movable in the longitudinal direction thereof while being engaged therewith when the plurality of lens frames are zoomed. Further, at least one cam groove out of the plurality of cam grooves are formed deeper than the other cam groove, and in the collapse part of the relatively deep cam groove, which is formed deeper than the other cam groove, an intersection intersected with the insertion part of the other cam groove are formed.

An imaging device of the present invention includes the lens barrel of the present invention.

Effects of the Invention

The present invention simplifies a cam groove structure in a cam frame and prevents a lens frame and the like from derailing in use.

Figure 1:
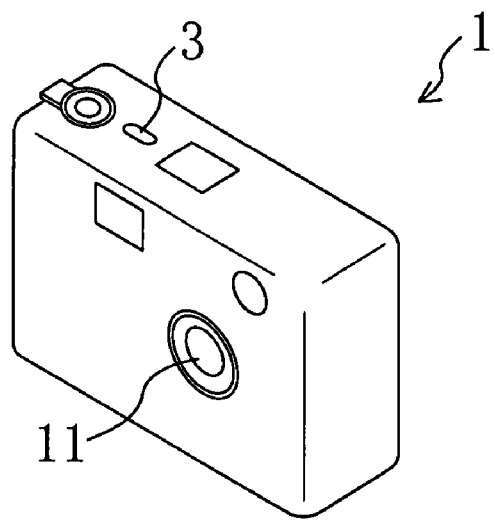
FIG. 1(a) is a perspective view of an imaging device in a collapsed state.
FIG. 1(b) is a perspective view of the imaging device in a shooting state.
Figure 1:
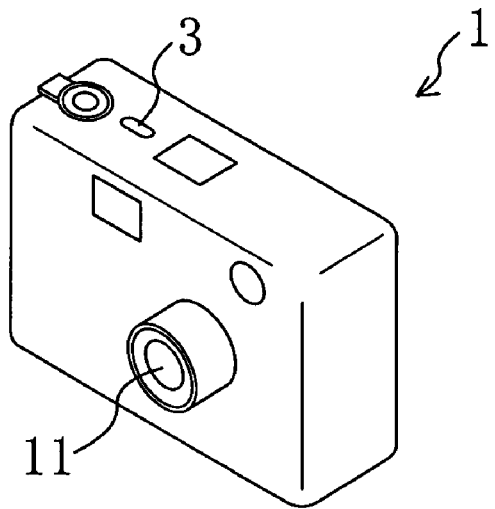

EXPLANATION OF REFERENCE NUMERALS 1 imaging device
11 lens barrel
19 cam frame
25, 27, 29 first, second, and third lens frame cam grooves (a plurality of cam grooves)
25a, 27a, 29a insertion parts
25b, 27b, 29b collapse parts
25c, 27c, 29c variable power parts
26 intersection
39, 45, 55 first, second, and third lens frames
43, 53, 56 first, second, and third cam pins Best Mode for Carrying out the Invention An embodiment of the present invention will be described below with reference to the drawings.

Embodiment 1

Embodiment 1 exemplifies, as an image device 1, a DSC incorporating an imaging element E, such as a CCD (charge coupled device) for describing a structure of the imaging device 1, a structure of a lens barrel 11 incorporated in the imaging device 1, and an operation of the lens barrel 11 with reference to FIG. 1 to FIG. 15.

—Structure of Imaging Device 1—

First, a structure of the imaging device 1 will be described with reference to FIG. 1. FIG. 1(a) is a perspective view of the imaging device 1 in a collapsed state, and FIG. 1(b) is a perspective view of the imaging device 1 in a shooting state.

In the imaging device 1 in a non-use state, as shown in FIG. 1(a), the lens barrel 11 is accommodated inside a device casing 3. For use, a power button 5 is pushed to allow the lens barrel 11 to extend from the device casing 3, as shown in FIG. 1(b). Namely, in use, the lens barrel 11 moves in a direction of the optical axis toward an object to be shot from an image plane side. This enables shooting at an arbitrary zoom ratio.

—Structure of Lens Barrel 11—

Figure 2:
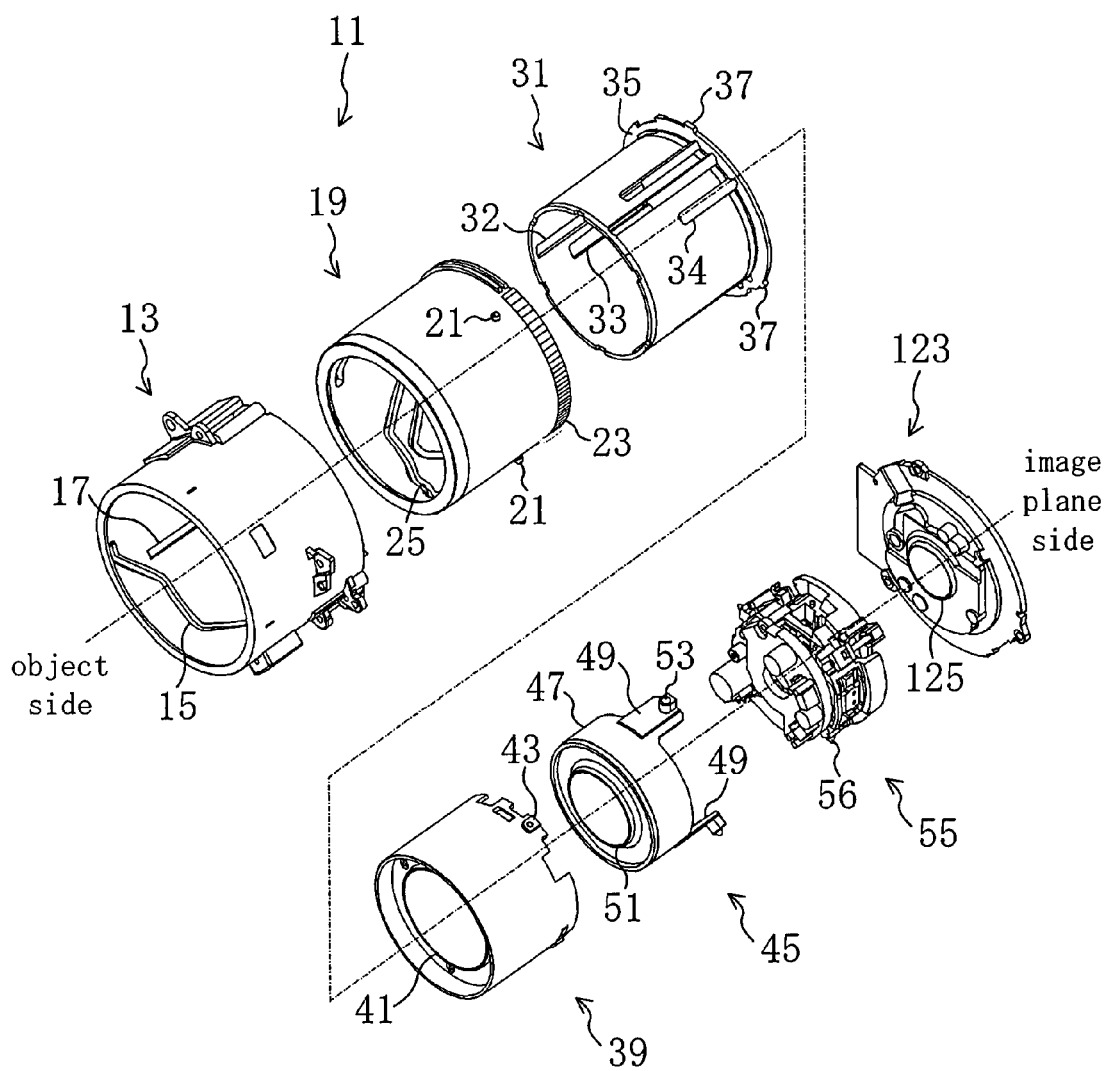
FIG. 2 is an exploded perspective view showing a structure of a lens barrel.
Figure 3:
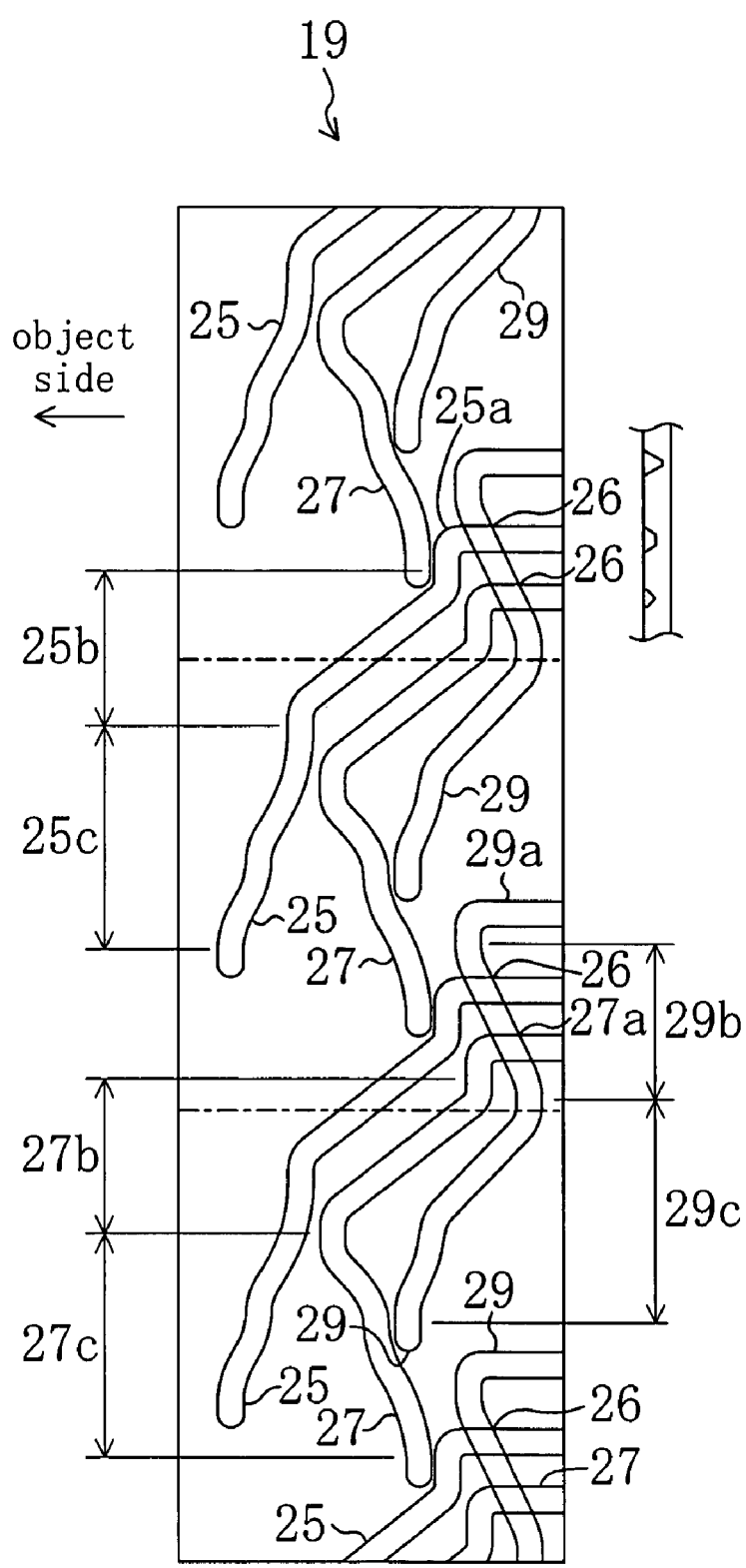
FIG. 3 is a development of an inner peripheral face of a cam frame.
Figure 4:
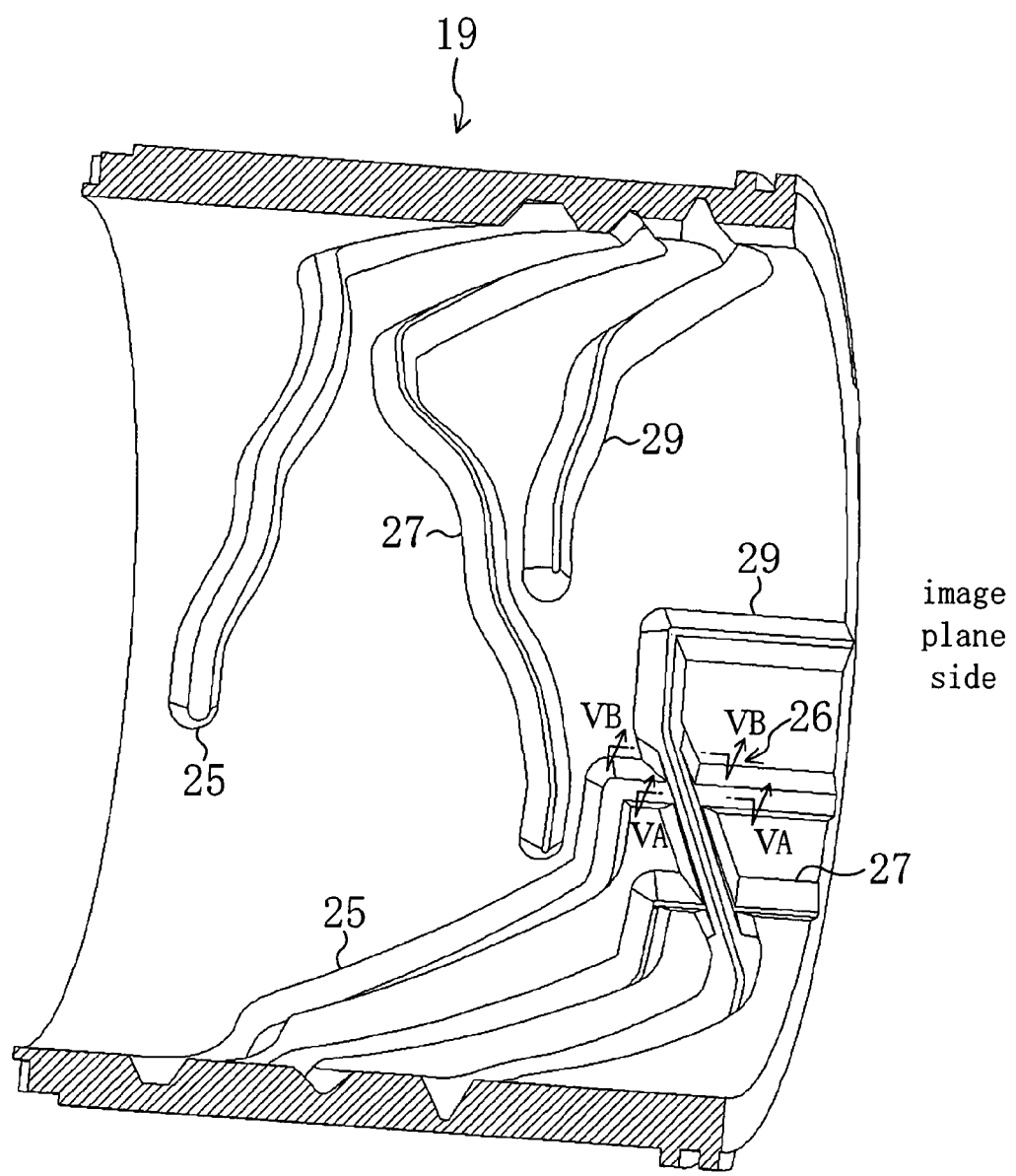
FIG. 4 is a perspective view of the inner peripheral face of the cam frame.
Figure 5:
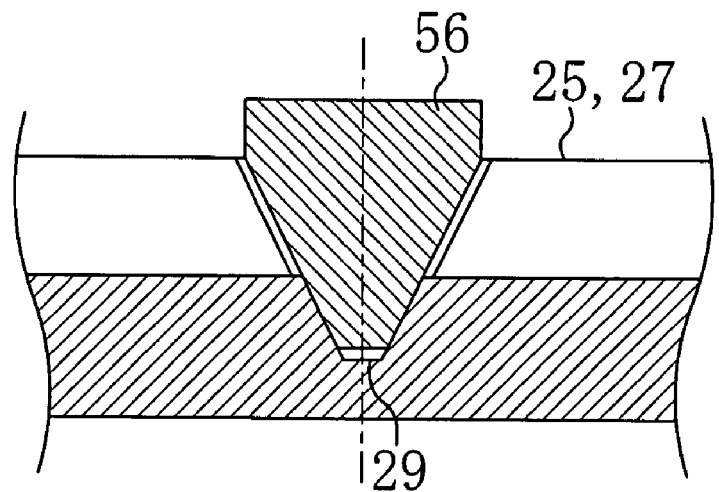
FIG. 5(a) is a sectional view taken along the line VA-VA in FIG. 4.
FIG. 5(b) is a sectional view taken along the line VB-VB in FIG. 4.
Figure 5:
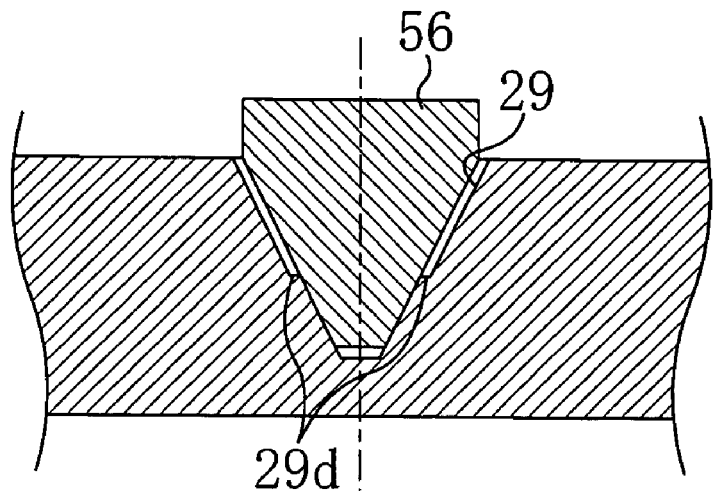
Figure 6:
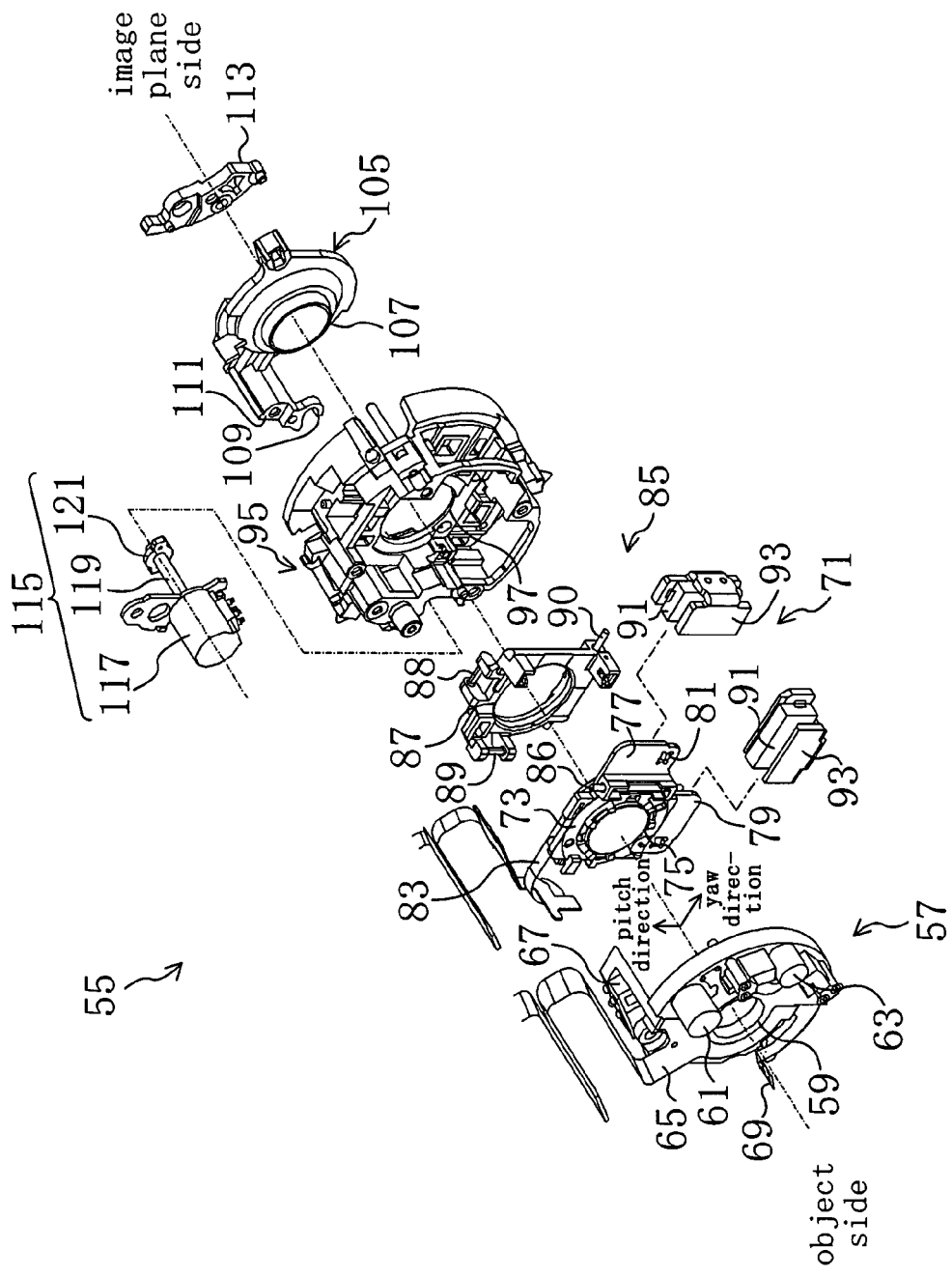
FIG. 6 is an exploded perspective view showing a structure of a third lens frame when viewed from an object side.
Figure 7:
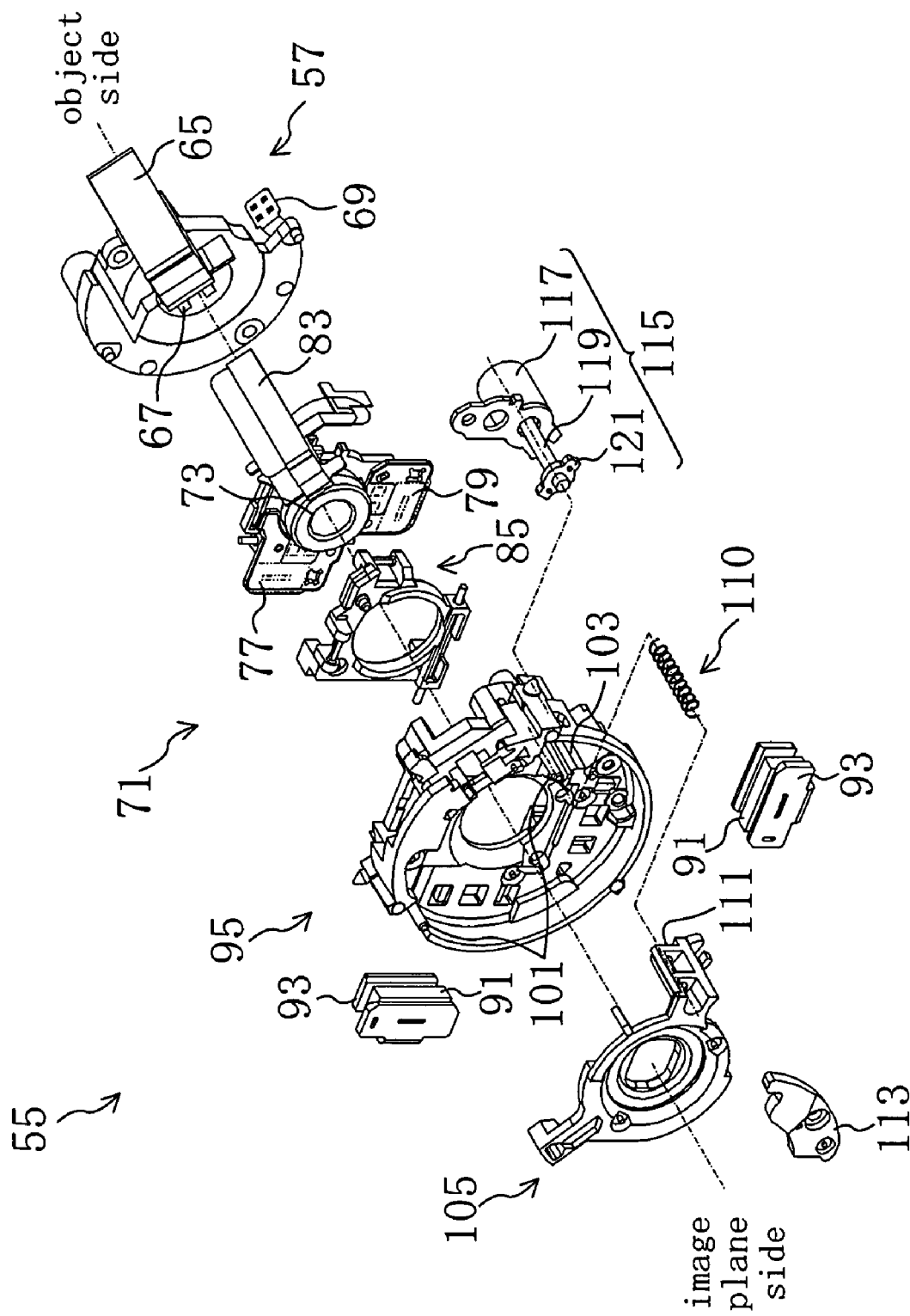
FIG. 7 is an exploded perspective view showing the structure of the third lens frame when viewed from an image plane side.
Figure 8:
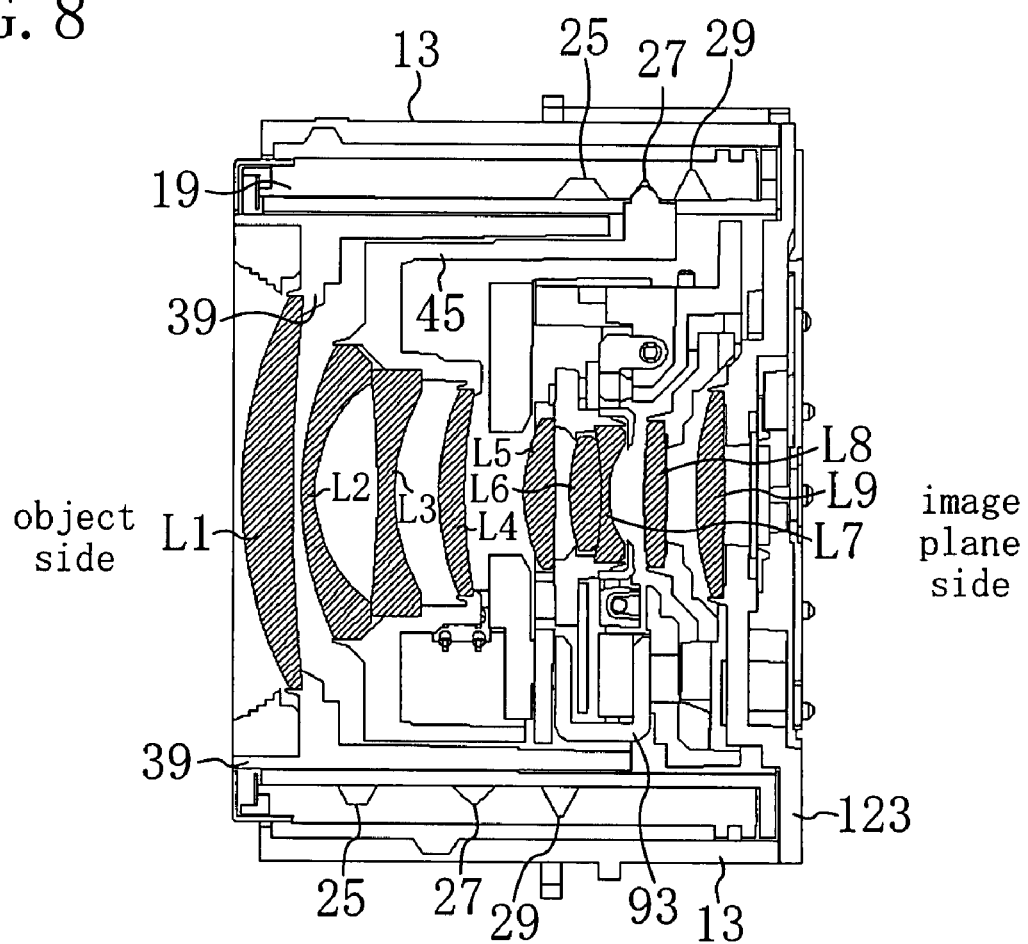
FIG. 8 is a vertical sectional view of the lens barrel in a collapsed state.
Figure 9:
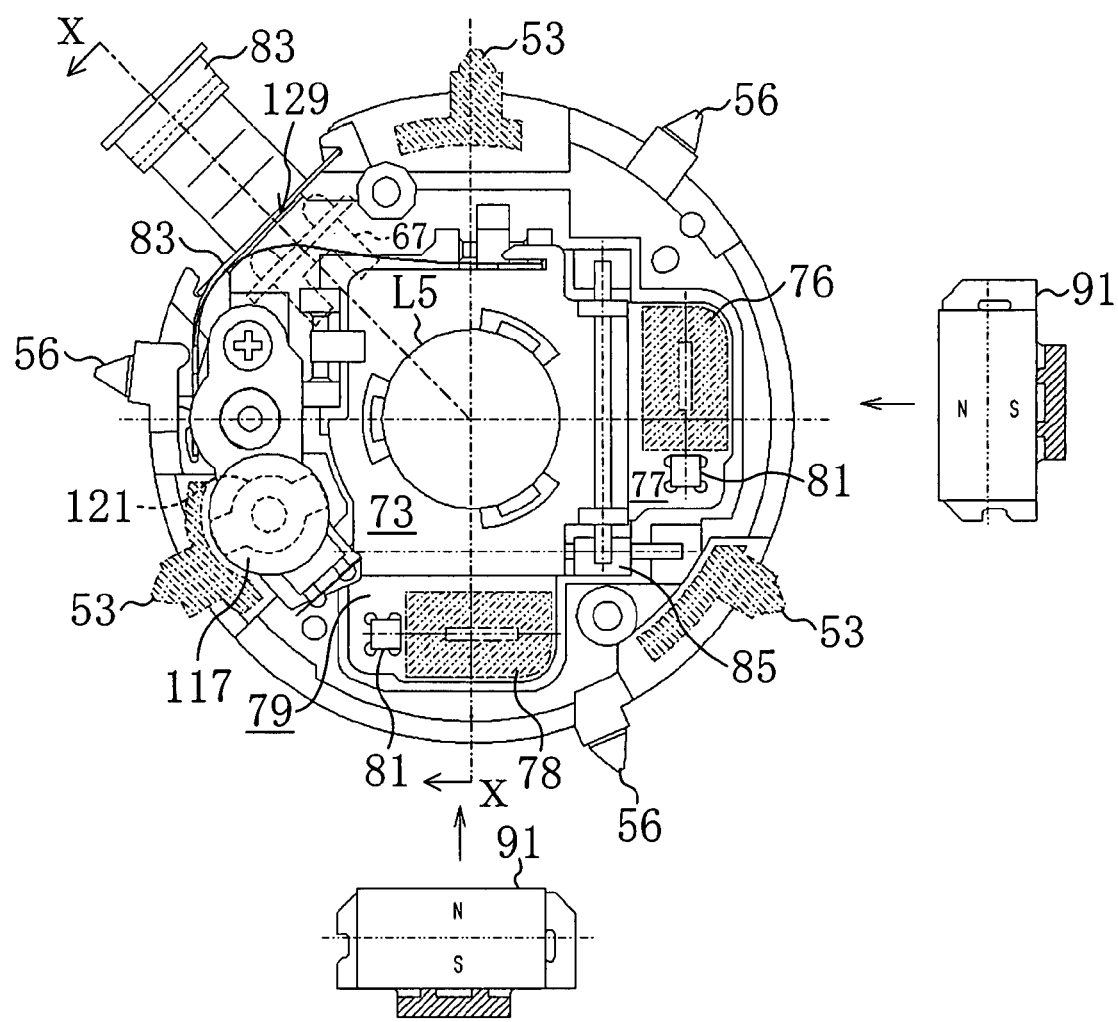
FIG. 9 is a plan view of the third lens frame when viewed from the object side.
Figure 10:
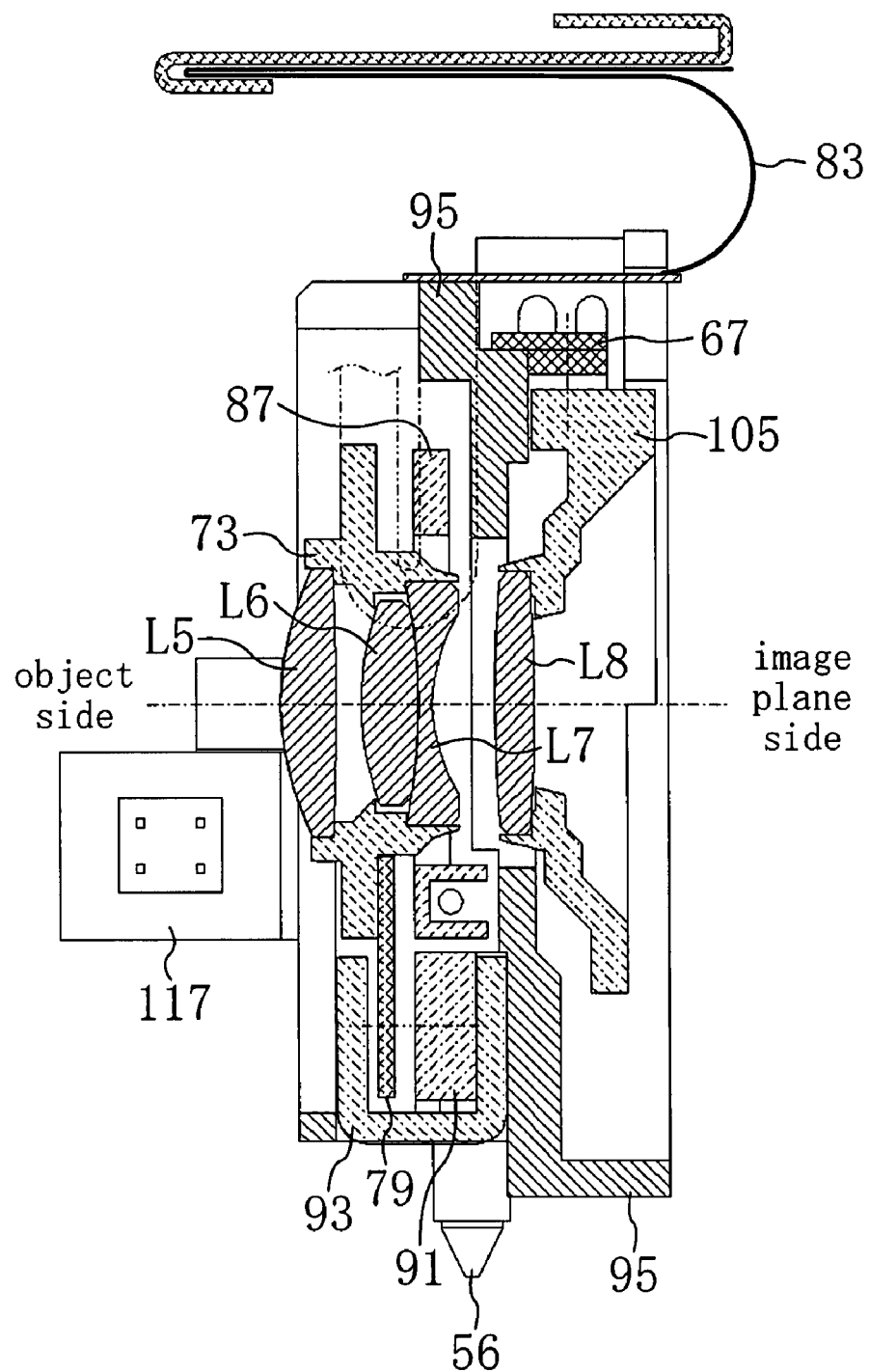
FIG. 10 is a sectional view taken along the line X-X in FIG. 9.

A structure of the lens barrel 11 will be described next with reference to FIG. 2 to FIG. 10. FIG. 2 is an exploded perspective view showing the structure of the lens barrel 11. FIG. 3 is a development of an inner peripheral face of a cam frame 19. FIG. 4 is a perspective view of the inner peripheral face of the cam frame 19. FIG. 5(a) is a sectional view taken along the line VA-VA in FIG. 4, and FIG. 5(b) is a sectional view taken along the line VB-VB in FIG. 4. FIG. 6 and FIG. 7 are exploded perspective views showing a structure of a third lens frame 55, wherein FIG. 6 is an exploded perspective view when viewed from an object side and FIG. 7 is an exploded perspective view when viewed from the image plane side. FIG. 8 is a vertical sectional view of the lens barrel 11 in a collapsed state. FIG. 9 is a plan view of the third lens frame 55 when viewed from the object side and specifically is a plan view of the third lens frame 55 from which a shutter unit 57 is taken away. FIG. 10 is a sectional view taken along the line X-X in FIG. 9. Hereinafter, "the image plane side" and "the object side" imply the image plane side and the object side of the members when assembled, respectively.

The lens barrel 11 includes, as shown in FIG. 2, a fixed frame 13, the cam frame 19, a sliding frame 31, a first lens frame 39, a second lens frame 45, the third lens frame 55, and a master flange 123, all of which are made of resin, such as polycarbonate.

The master flange 123 is, as shown in FIG. 2, substantially a plate-shaped member having the same diameter as the fixed frame 13, is arranged so as to cover the end faces on the image plane side of the fixed frame 13 and the like, and is fixed to a predetermined part (not shown) of the device casing 3. Further, the master flange 123 includes a fixed lens fitting portion 125 and a positioning protrusion 127 (shown in FIG. 13) on the object side and includes an imaging element fixing part (not shown) on the image plane side.

The fixed frame 13 is a cylindrical member as shown in FIG. 2. Three cam frame grooves 15 and three sliding frame grooves 17 are formed in the inner peripheral face of fixed frame 13. The cam frame grooves 15, 15, 15 are formed at regular intervals left in the peripheral direction and extend from the middle on the image plan side to the end on the object side of the fixed frame 13 nonlinearly. The sliding frame grooves 17, 17, 17 are arranged at regular intervals left in the peripheral direction and extend from the end on the image plane side to the middle on the object side thereof longitudinally without being intersected with the cam frame grooves 15. The fixed frame 13 includes a zooming motor (not shown).

The cam frame 19 is, as shown in FIG. 2, a cylindrical member having a diameter smaller than the fixed frame 13 and a length substantially the same as the fixed frame 13. In the outer peripheral face on the image plane side of the cam frame 19, three fixed frame cam pins 21, 21, 21 are provided at regular intervals left in the peripheral direction. A gear portion 23 is formed at the outer peripheral end part on the image plane side thereof. In the inner peripheral face thereof, first, second, and third lens frame cam grooves (a plurality of cam grooves) 25, 27, 29 are formed.

The number of the first lens frame cam groove 25 is three, as shown in FIG. 3 and FIG. 4, and they are arranged at regular intervals left in the peripheral direction of the cam frame 19. The same is applied to the second and third lens frame cam grooves 27, 29. Each of the first lens frame cam grooves 25 extends the farthest toward the object side, and each second lens frame cam groove 27 and each third lens frame cam groove (relatively deep groove) 29 are formed nearer to the image plane side in this order. The first, second, and third lens frame cam grooves 25, 27, 29 are formed so that first pins 43 (described later) of the first lens frame 39, second cam pins 53 (described later) of the second lens frame 45, and third cam pins 56 (described later) of the third lens frame 55 are engaged with the grooves 25, 27, 29 and are movable in the longitudinal direction thereof, respectively.

As shown in FIG. 3, the first, second, and third lens frame cam grooves 25, 27, 29 each include, from the image plane side in this order, insertion parts 25a, 27a, 29a, collapse parts 25b, 27b, 29b, and variable power parts 25c, 27c, 29c in the longitudinal direction of the grooves. Each of the insertion parts 25a, 27a, 29c is formed straight in parallel with the longitudinal direction of the cam frame 19 from the end on the image plane side thereof, and the collapse parts 25b, 27b, 29b and the variable power parts 25c, 27c, 29c are curved. The respective collapse parts 29b of the third lens frame cam grooves 29 are intersected with the respective insertion parts 25a, 27a of the first and second lens frame cam grooves 25, 27, as shown in FIG. 3 and FIG. 4.

Referring to the sections of the grooves, as sown in FIG. 3 and FIG. 4, each third lens frame cam grove 29 is formed deeper, specifically, approximately 0.5 mm deeper, preferably, approximately 1.0 mm deeper than the first and second lens frame cam grooves 25, 27. At intersections 26, as shown in FIG. 5(a), the third lens frame cam grooves 29 are formed so that the respective third cam pins 56 move with their tip end portions engaged therewith while the parts other than the tip end portions of the third cam pins 56 move without being engaged therewith. Specifically, the third lens frame cam grooves 29 are formed so that the third cam pins 56 are capable of being engaged with parts of the third lens frame cam grooves 29 from the groove bottom faces to parts intersected with the first and second lens frame cam grooves 25, 27 in the depth direction of the grooves while being incapable of being engaged with parts thereof from the parts intersected therewith to the openings. Herein, the tip end portion of each third cam pin 56 preferably ranges 0.5 mm from the tip end in the height direction of the third cam pin 56 and more preferably ranges 1.0 mm from the tip end in the height direction of the third cam pin 56. In the vicinity of the intersections, specifically, in regions approximately 0.5 mm apart from the intersections 26, more preferably, in regions approximately 3 mm apart from the intersections 26, the third lens cam grooves 29 include stepped portions 29d, as shown in FIG. 5(b). On the open side from the stepped portions 29d, the groove width of the third lens frame cam grooves 29 is wider, preferably, approximately 0.03 mm wider, more preferably, approximately 0.2 mm wider than the pin width of parts of the third cam pins 56 which correspond to the cam grooves 29. On the other hand, on the groove bottom side from the stepped portions 29d, the groove width of the third lens frame cam grooves 29 is substantially the same as the pin width of the parts of the third cam pins 56 which correspond to the cam grooves 29.

The sliding frame 31 is a cylindrical member having a diameter smaller than the cam frame 19 and a length substantially the same as the fixed frame 13, as shown in FIG. 2. Three pairs of sliding grooves 32, 33, 34 are formed in the side face thereof so as to pass from the outer peripheral face to the inner peripheral face in a direction substantially parallel with the longitudinal direction of the cylinder. Each pair of sliding grooves includes a first lens frame sliding groove 32, a second lens frame sliding groove 33, and a third lens frame sliding groove 34, wherein the first lens frame sliding grooves 32 are the longest of all, and the third lens frame sliding grooves 34 are the shortest of all. At the end on the image plane side of the sliding frame 31, a stopper rib 35 extends outward from the sliding frame 31, and three fixed frame protrusions 37, 37, 37 are arranged at the outer peripheral parts of the stopper rib 35 at regular intervals left in the peripheral direction.

The first lens frame 39 is, as shown in FIG. 2, a cylindrical member having a diameter smaller than the sliding frame 31 and a length slightly shorter than the fixed frame 13. A zoom lens fitting portion 41 is formed at the end on the object side thereof, and three first cam pins 43 (only one of them is shown in FIG. 2) are arranged at the end on the image plane side in the outer peripheral face thereof at regular intervals left in the peripheral direction. The first cam pins 43 are tapered as they go toward their tip ends.

The second lens frame 45 includes, as shown in FIG. 2, a cylindrical member 47 having a diameter smaller than the first lens frame 39 and a length shorter than the first lens frame 39 and three legs 49, 49, 49. The cylindrical member 47 includes on the object side thereof one lens fitting portion 51 capable of receiving three lenses. The legs 49 are arranged at and connected with the end part on the image plane side of the cylindrical member 47 at regular intervals left in the peripheral direction, and second cam pins 53 are arranged at tip ends of the outer peripheral faces of the legs 49. The second cam pins 53 are tapered as they go toward their tip ends.

The third lens frame 55 includes, as shown in FIG. 6 and FIG. 7, a shutter unit 57, a vibration compensation actuator 71, a lens frame main body 95, a focus lens frame 105, and a restricting member 113 in this order from the object side, and is further provided with a focus motor 115.

The focus motor 115 includes a motor section 117, a lead screw 119, and a nut piece 121. The lead screw 119 is arranged coaxially with and is connected to the motor section 117. The nut piece 121 is arranged symmetrically with the axis thereof as a center of symmetry and is connected to the lead screw 119.

The lens frame main body 95 includes a through hole portion 97 for allowing light to pass therethrough. A yaw guide shaft mounting portion (not shown) is formed on the object side of the lens frame main body 95. While, two guide poles 101, 101 are press fitted to the image plane side thereof so as to be substantially opposite to each other with the optical axis interposed, and a nut piece insertion hole 103 is formed under one of the guide poles 101. Three third cam pins 56, 56, 56 are formed so as to extend away from the optical axis. The third cam pins 56 are tapered as they go toward their tip ends and have a height larger than the first and second cam pins.

The focus lens frame 105 includes a focus lens fitting portion 107. On the object side of the focus lens frame 105, a focus spring receiver 111, a nut piece engaging portion 109, and a protrusion 105a (see FIG. 13 through to FIG. 15) are formed. The nut piece engaging portion 109 is formed under the focus spring receiver 111, and the protrusion 105a protrudes toward the object side.

The restricting member 113 is mounted on the image plane side of the nut piece engaging portion 109 of the focus lens frame 105 so as to restrict the movable range of the nut piece 121.

The vibration compensation actuator 71 is composed of a yaw frame 85, a pitch frame 73, two multilayer printed circuit boards 77, 79, a power supply flexible substrate 83, two magnets 91, 91, and two yokes 93, 93.

The yaw frame 85 includes a through hole portion 87 for allowing light to pass therethrough, two yaw guide shafts 88, 90, and a pitch guide shaft 89 so as to move correction lenses L5, L6, L7 in the yaw direction for compensating image blurring in the yaw direction. The yaw guide shafts 88, 90 are opposed to each other substantially in parallel with the yaw direction so that that the yaw frame 85 is mounted to the lens frame main body 95 movably in the yaw direction. The pitch guide shaft 89 is arranged in parallel with the pitch direction so that the pitch frame 73 is movable in the pitch direction.

The pitch frame 73 includes a correction lens fitting portion 75 and a pitch guide shaft 86 so as to move the correction lenses L5, L6, L7 in the pitch direction for compensating image blurring in the pitch direction. The pitch guide shaft 86 is arranged substantially in parallel with the pitch direction on the opposite side of the optical axis to the pitch guide shaft 89 of the yaw frame 85 so that the pitch frame 73 is mounted to the yow frame 85 movably in the pitch direction.

Each multilayer printed circuit board 77, 79 is formed of stacked substrates of multiple layers (generally four layers) in which coils 76, 78 are printed. One 77 of the multilayer printed circuit boards is connected to a vertically extending end face of the pitch frame 73 while the other multilayer printed circuit board 79 is connected to a transversely extending end face of the pitch frame 73. Hole sensors 81, 81 for detecting the positions of the correction lenses L5, L6, L7 are incorporated in the multilayer printed circuit boards 77, 79, respectively. The power supply flexible substrate 83 extends from the multilayer printed circuit boards 77, 79, bends from the pitch frame 73 toward the image plane side, bends once toward the object side, and then bends toward the image plane side again. The two printed circuit boards 77, 79 may be formed integrally.

Each magnet 91 is a plate magnet. Each yoke 93 has a substantially hook-like shape in section.

The shutter unit 57 includes a disk-shaped support frame having a through hole portion 59 for allowing light to pass therethrough, a shatter actuator 61, a diaphragm actuator 63, a power supply flexible substrate 65, and an origin sensor 67. The shutter actuator 61 and the diaphragm actuator 63 are boarded on the surface on the object side of the support frame. The power supply flexible substrate 65 is mounted on the surface on the object side of the support frame. One end of the power supply flexible substrate 65 bends toward the image plane side, is overlapped in the middle thereof with the power supply flexible substrate 83 of the pitch frame 73, bends once toward the object side, and then bends toward the image plane side again. The other end of the power supply flexible substrate 65 extends outward from the support frame to serve as a focus motor connecting portion 69. With the above arrangement, the power supply flexible substrate 65 is connected electrically to the shutter actuator 61, the diaphragm actuator 63, the origin sensor 67, and the motor section 117 of the focus motor 115. The origin sensor 67 is mounted on the image plane side of the support frame so as to detect a focus origin and a zoom origin.

—Arrangement in Lens Barrel—

The arrangement in the lens barrel 11 will be described next.

In the lens barrel 11, the positioning protrusion 127 of the master flange 123 presses the focus lens frame 105. As shown in FIG. 8, the fixed frame 13 is arranged at the outermost side of the lens barrel 11. The cam frame 19, the sliding frame 31, the first lens frame 39, and the second lens frame 45 are arranged in this order toward the inside. The third lens frame 55 is arranged the innermost side thereof. In detail, the fixed frame cam pins 21 are engaged with the cam frame grooves 15 of the fixed frame 13 so that the cam frame 19 is arranged inside the fixed frame 13. The fixed frame protrusions 37 are engaged with the sliding frame grooves 17 of the fixed frame 13 so that the sliding frame 31 is arranged inside the cam frame 19.

In the first lens frame 39, the first cam pins 43 pass through the first lens frame sliding grooves 32 of the sliding frame 31 and are engaged with the insertion parts 25*a* of the first lens frame cam grooves 25 of the cam frame 19. The first cam pins 43 pass the intersections 26 and move in the longitudinal direction of the insertion parts 25*a* to the boundary between the insertion parts 25*a* and the collapse parts 25*b* with the engaged state thereof maintained. Whereby, the first lens frame 39 is arranged inside the sliding frame 31. Similarly, in the second lens frame 45, the second cam pins 53 pass through the second lens frame sliding grooves 33 of the sliding frame 31 and are engaged with the insertion parts 27*a* of the second lens frame cam grooves 27 of the cam frame 19. The second cam pins 53 pass the intersections 26 and move in the longitudinal direction of the insertion parts 27*a* to the boundary between the insertion parts 27*a* and the collapse parts 27*b* with the engaged state thereof maintained. Whereby, the second lens frame 45 is arranged inside the first lens frame 39.

In the third lens frame 55, the third cam pins 56 pass through the third lens frame sliding grooves 34 of the sliding frame 31 and are engaged with the insertion parts 29*a* of the third lens frame cam grooves 29 of the cam frame 19. The third cam pins 56 move, without passing the intersections 26, in the longitudinal direction of the insertion parts 29*a* to the boundary between the insertion parts 29*a* and the collapse parts 29*b* with the engaged state thereof maintained. Whereby, the third lens frame 55 is arranged inside the second lens frame 45.

At the intersections 26, as shown in FIG. 5(*a*), the tip ends of the third cam pins 56 are engaged with the groove bottom side of the third lens frame cam grooves 29 while parts other than the tip ends thereof are not engaged with the open side of the third lens frame cam grooves 29. In the vicinity of the intersections 26, specifically, in regions approximately 0.5 mm apart from the intersections 26, more preferably, in regions approximately 3 mm apart from the intersections 26, the third lens frame cam grooves 29 and the third cam pins 56 are separated from each other on the open side from the stepped portions 29*d* of the third lens frame cam groove 29 while the third lens frame cam grooves 29 and the third cam pins 56 are in contact with each other on the groove bottom side from the stepped portions 29*d* of the third lens frame cam grooves 29.

—Arrangement in Third Lens Frame 55—

An arrangement in the third lens frame 55 will be described next.

As shown in FIG. 6 and FIG. 7, in the third lens frame 55, the shutter unit 57, the pitch frame 73, the yaw frame 85, the lens frame main body 95, and the focus lens frame 105 are arranged in this order so that the through hole portion 59 of the shutter unit 57, the correction lens fitting portion 75 of the pitch frame 73, the through hole portion 87 of the yaw frame 85, the through hole portion 97 of the lens frame main body 95, and the focus lens fitting portion 107 of the focus lens frame 105 are overlapped with one another.

On the image plane side of the lens frame main body 95, as shown in FIG. 7, one end of the focus spring (an elastic member) 110 is inserted in one of the guide poles 101 while the other end of the focus spring 110 is urged against the focus spring receiver 111 of the focus lens frame 105. This causes the focus lens frame 105 to urge the lens frame main body 95 by means of the focus spring 110. In the focus motor 115, grease is applied to the lead screw 119, and the nut piece 121 passes through the nut piece insertion part 103 of the lens frame main body 95 and is engaged with the nut piece engaging portion 109 of the focus lens frame 105. Further, the restricting member 113 is arranged on the image plane side of the nut piece 121.

On the other hand, on the object side of the lens frame main body 95, the yaw frame 85 is mounted to the lens frame main body 95 movably in the yaw direction in such a fashion that the yaw guide shafts 88, 90 of the yaw frame 85 are mounted to the yaw guide shaft mounting portions of the lens frame main body 95. The pitch frame 73 is mounted to the yaw frame 85 movably in the pitch direction in such a fashion that the pitch guide shaft 89 of the yaw frame 85 is mounted to the pitch guide shaft mounting portions. The yokes 93, 93 include, as shown in FIG. 6, hook-like spaces in which the magnets 91, 91 are housed to form magnetic fields, and are inserted in and fixed to the lens frame main body 95 from the outer periphery so that the coils 76, 78 of the multilayer printed circuit boards 77, 79 mounted to the pitch frame 73 are arranged in the magnetic fields. The power supply flexible substrate 65 of the shutter unit 57 is overlapped with the power supply flexible substrate 83 of the pitch frame 73 so that the shutter unit 57 is fixed at the outer peripheral part of the lens frame main body 95.

When viewing the third lens frame 55 from the image plane side or the object side, as shown in FIG. 9, the three third cam pins 56, 56, 56 are formed at regular intervals left in the peripheral direction. The origin sensor 67 is arranged at a drawing point 129 of the power supply flexible substrate. The motor section 117 of the focus motor 115 is arranged on a site having a larger angle out of angles formed by connecting the one multilayer printed circuit board 77 and the other multilayer printed circuit board 79 with one point on the optical axis. In other words, the motor section 117 of the focus motor 115 is arranged in a region other than a region interposed between the one multilayer printed circuit board 77 and the other multilayer printed circuit board 79. Though not shown in FIG. 9, the motor section 117 of the focus motor 115, the shutter actuator 61, and the diaphragm actuator 63 are arranged along the inner peripheral face of the cylindrical member 47 of the second lens frame 45 so as not to intercept the light.

As shown in FIG. 6 and FIG. 7, the shutter unit 57 is arranged on the object side of the vibration compensation actuator 71 in the direction of the optical axis. Further, as shown in FIG. 10, the motor section 117 of the focus motor 115 is arranged on the object side of the correction lenses L5, L6, L7, namely, on the object side of the vibration compensation actuator 71, similarly to the shutter unit 57.

—Operation of Lens Barrel 11—

Figure 11:
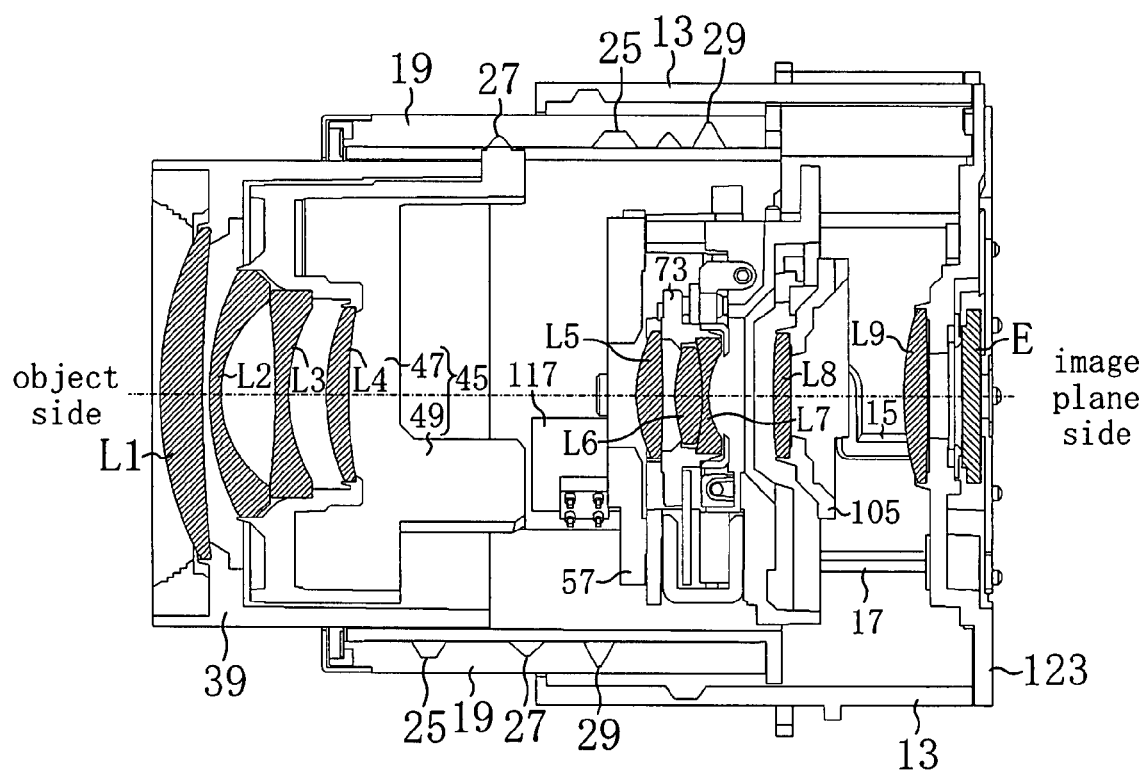
FIG. 11 is a vertical sectional view of the lens barrel in an extended state.
Figure 12:
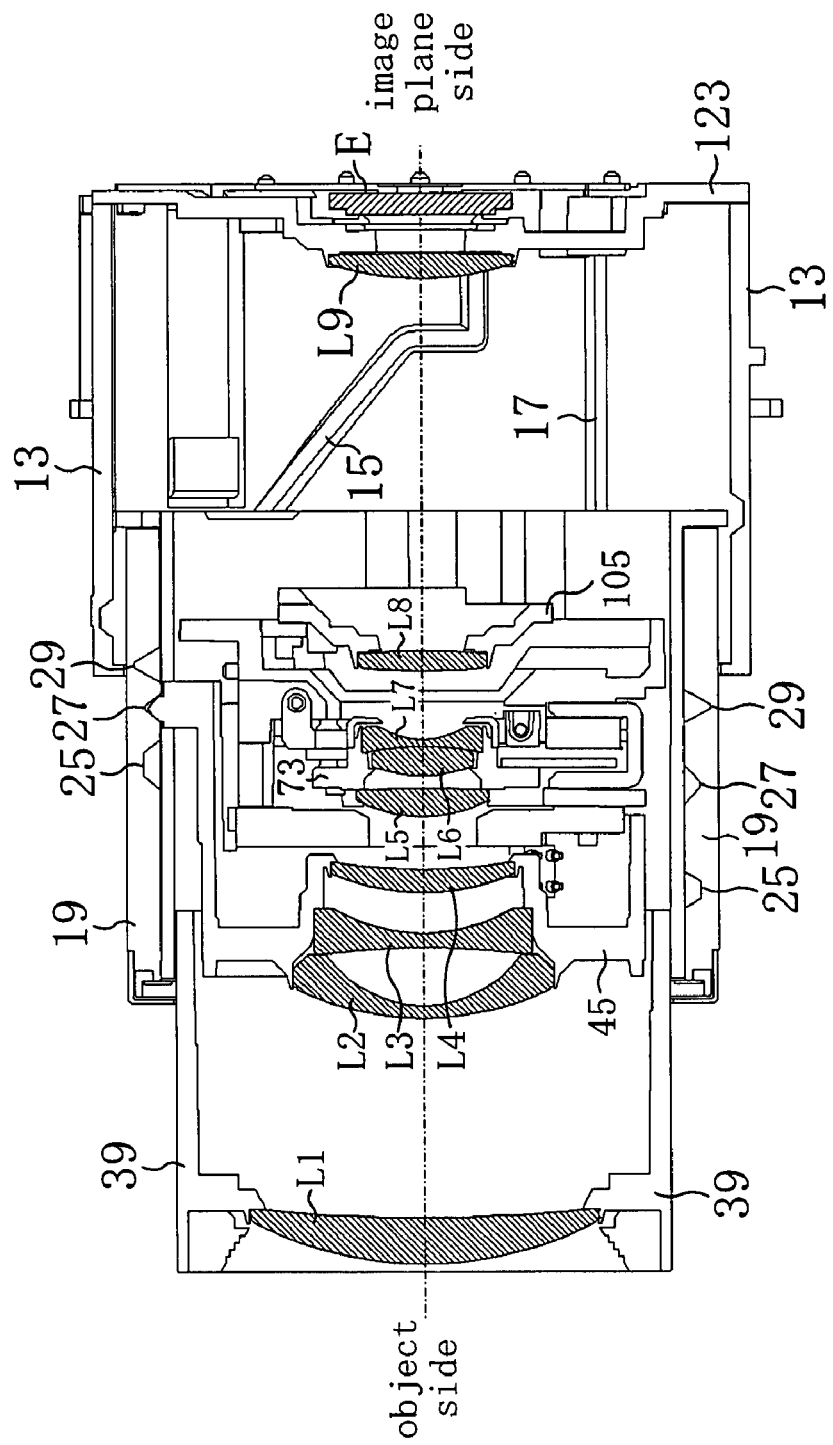
FIG. 12 is a vertical sectional view of the lens barrel under variable power control.

An operation for extending the lens barrel 11 and an operation for focus adjustment will be described next with reference to FIG. 8, FIG. 11, and FIG. 12. FIG. 11 is a vertical sectional view of the lens barrel in an extended state, and FIG. 12 is a vertical sectional view of the lens barrel under variable power control.

The operation for extending the lens barrel 11 will be described first.

The lens barrel 11 is in the state as described above until the power is supplied to the imaging device 1. Namely, all of the cam frame 19, the sliding frame 31, the first lens frame 39, the second lens frame 45, and the third lens frame 55 are located inside the fixed frame 13. Usually, a zoom lens L1 having a positive refractive index is fitted in the lens fitting portion 41 of the first lens frame 39, three lenses L2, L3, L4 having a negative refractive index in total are fitted in the lens fitting portion 51 of the second lens frame 45, the three correction lenses L5, L6, L7 having a positive refractive index in total are fitted in the correction lens fitting portion 75 of the pitch frame 73 of the third lens frame 55, and the focus lens L8 is fitted in the focus lens fitting portion 107 of the focus lens frame 105 of the third lens frame 55. The fixed lens L9 is fitted in the lens fitting portion 125 of the master flange 123, and the imaging element E is fixed to the imaging element fixing portion. The respective numbers of lenses fitted to the first, second, and third lens frames 39, 45, 55 and the positive/negative refractive indices of the lenses are not limited thereto.

When the power is supplied to the imaging device 1, the lens barrel 11 is extended as shown in FIG. 11.

Specifically, when the power is supplied to the imaging device 1, the zooming motor of the fixed frame 13 rotates to rotate the gear portion 23 of the cam frame 19. This rotates the cam frame 19 in the peripheral direction. Specifically, the cam frame 19 moves in the longitudinal direction with the cam frame pins 21 engaged with the cam frame grooves 15 of the fixed frame 13 to be extended toward the object side. At the same time, the sliding frame 31 is extended together with the cam frame 19 toward the object side without being rotated with the fixed frame protrusions 37 engaged with the sliding frame groves 17 of the fixed frame 13. As well, in association with extension of the cam frame 19, the first, second, and third lens frames 39, 45, 55 are extended toward the object side without being rotated in such a state that the first, second, and third cam pins 43, 53, 56 pass through the first, second, and third lens frame sliding grooves 32, 33, 34 of the sliding frame 31, respectively, and are engaged with the first, second, and third lens frame cam grooves 25, 27, 29 of the cam frame 19, respectively. In this state, the distance between the second lens frame 45 and the first lens frame 39 is small while the distance between the second lens frame 45 and the third lens frame 55 is large, which means that the lens barrel 11 is in the WIDE extremity position presenting the widest angle optically.

In the case where the lens barrel 11 is extended and then the magnification is set high, the cam frame 19 is further extended toward the object side. Also, the first, second, and third lens frames 39, 45, 55 are moved relatively in the longitudinal direction along the cam grooves 25, 27, 29. As a result, as shown in FIG. 12, the distance between the second lens frame 45 and the first lens frame 39 becomes large while the third lens frame 55 approaches the second lens frame 45, so that the lens barrel 11 is in the TELE extremity position presenting the largest zoom magnification optically.

The operation for focus adjustment will be described next.

For adjusting the focus, the motor section 117 of the focus motor 115 is driven first to rotate the lead screw 119. The nut piece 121 is engaged with a guide portion 103, which is provided at the third lens frame 55 in the direction of the optical axis, so as to be inhibited from rotating and, therefore, is movable in the direction of optical axis by the rotation of the lead screw 119. The focus lens frame 105 is urged all the time by the focus spring 115 toward the image plane side so as to be engaged with the nut piece 121 at the nut piece engaging portion 109. With this arrangement, the focus lens frame 105 is moved in the direction of the optical axis together with the nut piece 121 to change the distance between the pitch frame 73 and the focus lens frame 105. Namely, the distance between the correction lenses L5, L6, L7 and the focus lens L8 is changed so that the focus is adjusted.

—Operation of Origin Sensor 67—

Figure 13:
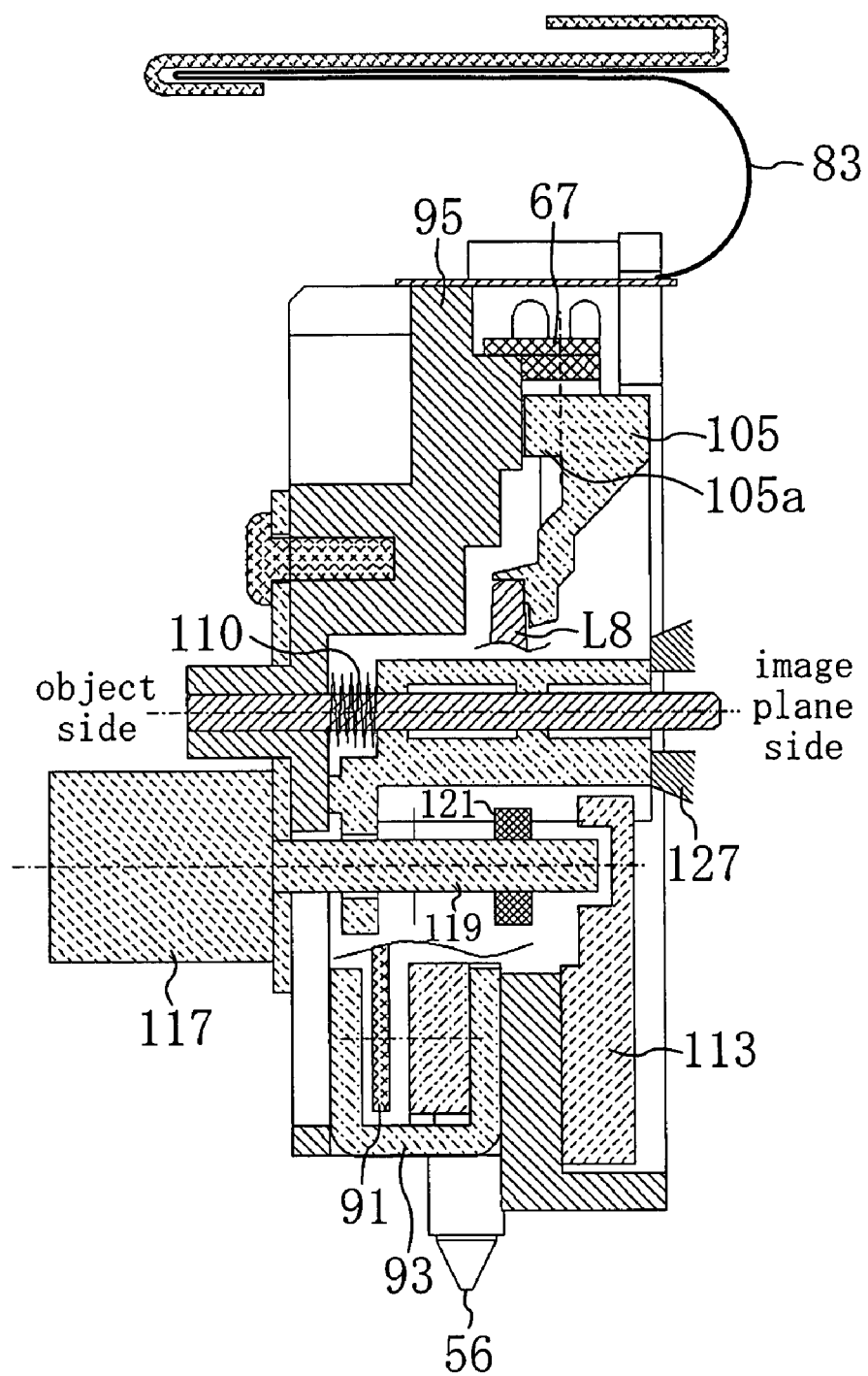
FIG. 13 is a vertical sectional view of the third lens frame before detection of a zooming origin.
Figure 14:
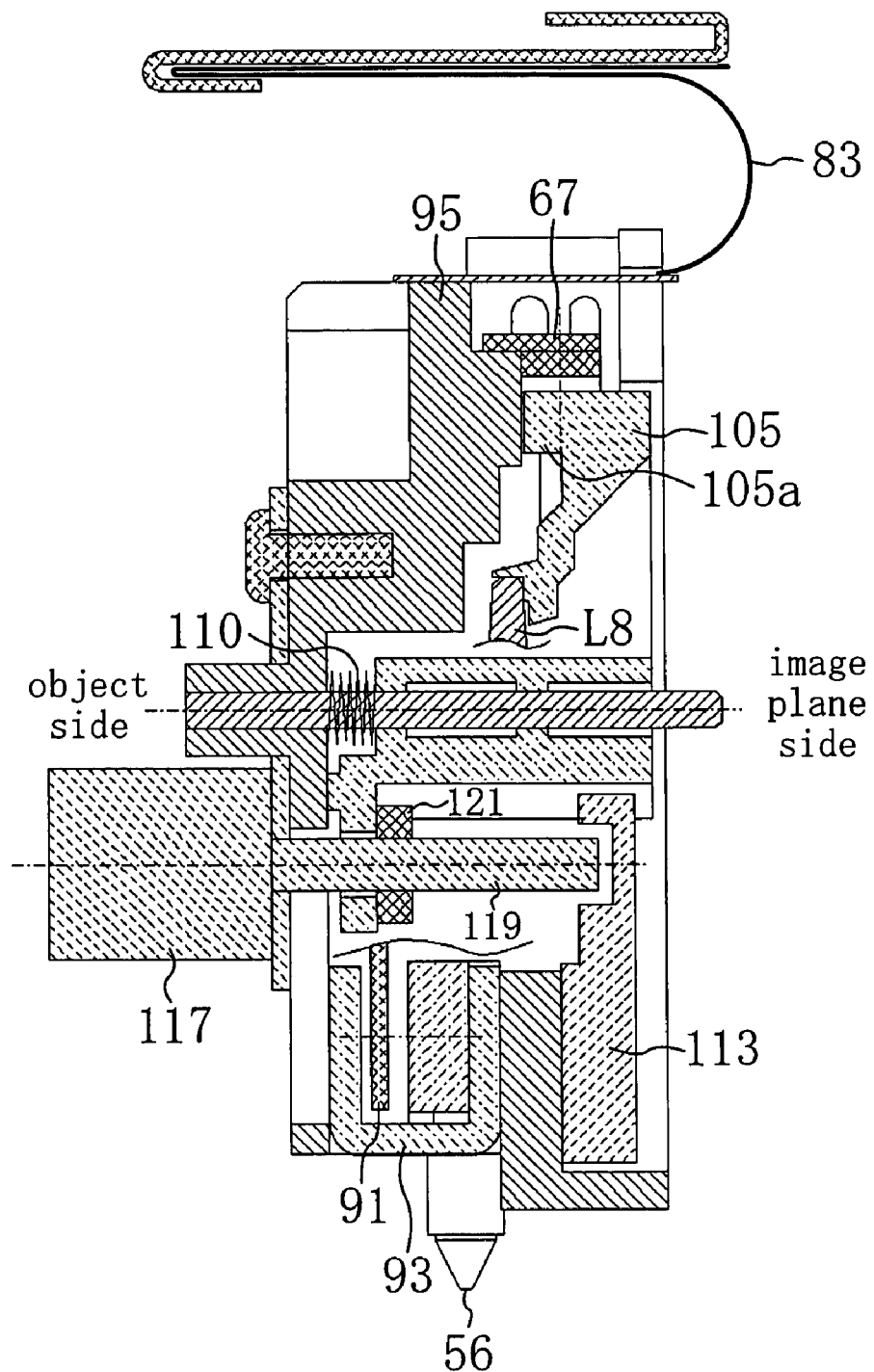
FIG. 14 is a vertical sectional view of the third lens frame before detection of a focus origin.
Figure 15:
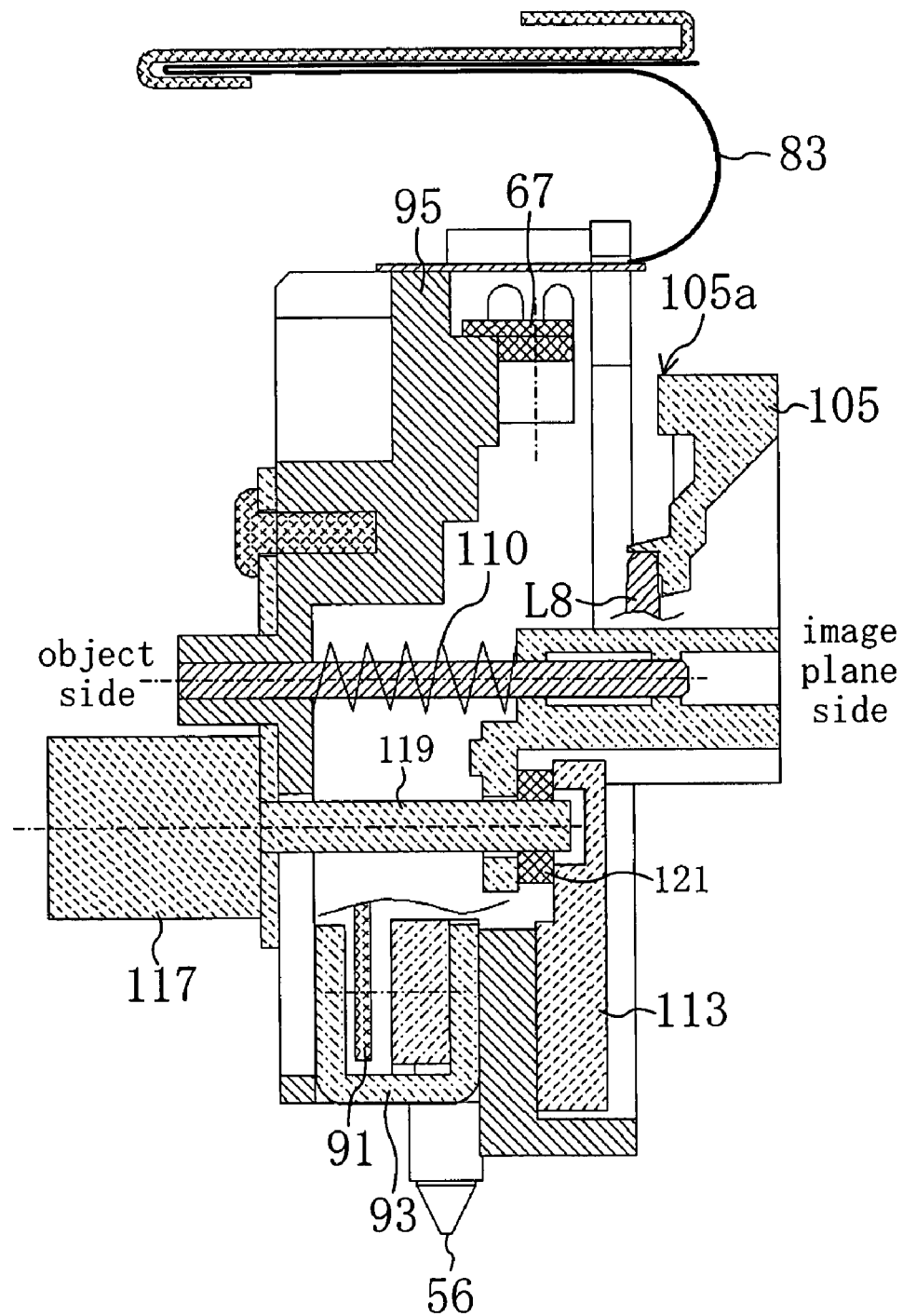
FIG. 15 is a vertical sectional view of the third lens frame after detection of the focus origin.

An operation of the origin sensor 67 will be described next with reference to FIG. 13 to FIG. 15. FIG. 3 to FIG. 15 are sections taken along the line X-X in FIG. 9. FIG. 13 is a view showing a structure of the third lens frame 55 before the zoom origin is detected and shows the collapsed state. FIG. 14 is a view showing a structure of the third lens frame 55 before the focus origin is detected and shows the state where the focus lens is located the nearest to the object side. FIG. 15 is a view showing a structure of the third lens frame 55 after the focus origin is detected and shows the state where focus lens is located the nearest to the image plane side.

In detecting the zoom origin, as shown in FIG. 13, the lens barrel 11 is in the collapsed state first. In the collapsed state, the positioning protrusion 127 of the master flange 123 presses the focus lens frame 105. Further, the nut piece 121 is just arranged slightly away from the restricting member 113 on the object side and is not engaged with the focus lens frame 105. In other words, the positioning protrusion 127 of the master flange 123 sets the position of the focus lens frame 105 with respect to the third lens frame 55.

When the zooming motor is driven, the third lens frame 55 is extended. At extension, the focus lens frame 105 remains pressed by the positioning protrusion 127 of the master flange 123 so as not to be extended toward the object side. On the other hand, driving the zooming motor results in extension of the lens frame main body 95 toward the object side. Accordingly, the lens frame body member 95 is moved away from the focus lens frame 105 in the direction of the optical axis. At this movement, the protrusion 105a of the focus lens frame 105 passes the center of the origin sensor 67, so that that zoom origin is detected. Thus, driving the zooming motor results in origin detection. When the extension is continued to allow the focus lens frame 105 to be engaged with the nut piece 121, the focus lens frame 105 is extended together with the third lens frame 55 so that the lens barrel 11 is in the WIDE extremity position capable of shooting. In this state, the third lens frame 55 is extended sufficiently toward the object side, so that the focus lens frame 105 is out of contact with the positioning protrusion 127 of the master flange 123.

Next, in detecting the focus origin, when the motor section 117 of the focus motor 115 is driven and the lens barrel 11 is extended to be in the WIDE extremity position in FIG. 11, the lead screw 119 is rotated to move the nut piece 121 and the focus frame 105 toward the object side, thereby allowing the lens barrel 11 to be in the state shown in FIG. 14.

Subsequently, when the focus motor 115 is rotated in the reverse direction, the nut piece 121 moves the focus lens frame 105 toward the image plane side. As a result, as shown in FIG. 15, the protrusion 105*a* of the focus lens frame 105 passes the center of the origin sensor 67. Accordingly, the origin sensor 67 detects the focus origin. Namely, driving the focus motor results in origin detection.

—Effects by Lens Barrel 11—

As described above, in the cam frame 19 of the lens barrel 11, the third lens frame cam grooves 29 are intersected at the collapse parts thereof with the respective insertion parts of the fist and second lens frame cam grooves 25, 27. Further, the third lens frame cam grooves 29 are formed deeper than the first and second lens frame cam grooves 25, 27. Accordingly, at the intersections 26, the third cam pins 56 move in the longitudinal direction of the deeper grooves while being engaged with the deeper grooves, to be prevented from derailing from the third lens frame cam grooves 29.

Further, the first and second lens frame cam grooves 25, 27 are intersected at the respective insertion parts 25*a*, 27*a* with the third lens frame cam grooves 29, which means that the intersections 26 are formed in regions other than region where the first and second cam pins 43, 53 pass in use. Accordingly, the first and second cam pins 43, 53 do not pass the intersections 26 in operation to be prevented from derailing.

In sum up, since the third lens frame cam grooves 29 are deeper than the first and second lens frame cam grooves 25, 27, the third cam pins 56 are prevented from derailing at the intersections 26. On the other hand, the first and second cam pins 43, 53 do not pass the intersections 26 in operation, resulting in no derailing thereof at the intersections 26.

Moreover, as described above, the first and second cam pins 43, 53 are prevented from derailing from the first and second lens frame cam grooves 25, 27, respectively, in operation, eliminating the need to provide a derailment preventing member additionally. Hence, the cam frame 19 can be manufactured at low cost.

At the intersections 26 and in the vicinity of the intersections 26, the third lens frame cam grooves 29 are formed so that the third cam pins 56 moves with the tip ends thereof engaged with the third lens frame cam grooves 29 and with no other parts thereof engaged with the third lens frame cam grooves 29. Namely, in the middle of and in the front and rear regions of the intersections 26, the third cam pins 56 slide on the third lens frame grooves 29 with the groove bottom sides thereof from the step portions 29*d* being always in contact with the third lens frame cam grooves 29, so as not to be in discontinuous contact with the wall face on the groove open sides thereof at the boundary part of the intersections 26. Hence, continuous and smooth sliding can be achieved even at the intersections 26, leading to smooth extension of the lens barrel 11.

The imaging device 1 includes the lens barrel 11, achieving substantially the same effects as the lens barrel 11.

Embodiment 2 of the Invention

A lens barrel and an imaging device of Embodiment 2 are substantially the same as those in Embodiment 1, wherein the structure of the cam grooves in the cam frame are different. Specifically, while the third lens frame cam grooves are formed deeper than the first and second lens frame cam grooves as well, the third lens frame cam grooves are intersected at the collapse parts thereof with the respective collapse parts of the first and second lens frame cam grooves.

At the intersections, the third lens frame cam grooves are so formed, as shown in FIG. 5(*a*), that the third cam pins moves with the tip ends thereof engaged with the third lens frame cam grooves and with no other parts thereof engaged with the third lens frame cam grooves. Further, in the vicinity of the intersections, as shown in FIG. 5(*b*), the third lens frame cam grooves include the step portions. The groove width of the third lens frame cam grooves are wider than the pin width of corresponding parts of the third cam pins on the open sides from the step portions while being substantially the same as the pin width of corresponding parts of the third cam pins on the groove bottom sides from the step portions.

As described above, even though the first and second lens frame cam grooves are intersected with parts of the third lens frame cam grooves other than the insertion parts, the third cam pins can move smoothly at the intersections and in the vicinity of the intersections because only the tip ends of the third cam pins are in contact with the third lens frame cam grooves at the intersections and in the vicinity of the intersections.

It is noted that the first and second cam pins may have an elliptical shape long in the traveling direction at the intersections so as not to derail at the intersections.

Other Embodiments

Any of the following arrangements may be employed in Embodiments 1 and 2.

Any of the following arrangements may be employed in the present embodiments.

The focus motor 115 includes the motor section 117, the lead screw 119 coaxial with the motor section 117, and the nut piece 121 of which axis serves as the symmetric center, but the lead screw 119 may not be necessarily coaxial with the motor section 117 and may be reversed through a transmission mechanism.

In the case where the lead screw 119 is reversed, the motor section 117 or the lead screw 119 of the focus motor 115 may not be necessarily arranged on the site having the larger angle out of the angles formed by connecting the one multilayer printed circuit board 77 and the other multilayer printed circuit board 79 with one point on the optical axis and may be arranged in a region where the multilayer printed circuit boards 77, 79 are not arranged. Specifically, the motor section 117 may be arranged on the site having the smaller angle out of the above angles, namely, may be arranged in a region interposed between the one multilayer printed circuit board 77 and the other multilayer printed circuit boards 79.

The origin sensor 67 is arranged at the drawing point 129 of the power supply flexible substrate, but may be arranged in a region where the multilayer printed circuit boards 77, 79, the motor section 117 of the focus motor 115, the third cam pins 56, the second cam pins 53 of the second lens frame 45, and the like are not arranged.

Furthermore, the first, second, and third cam pins 43, 53, 56 are tapered as they go toward their tip ends, but may be cylindrical. In the case where the first, second, and third cam pins are formed cylindrically, the respective first, second, and third lens frame cam grooves are preferably formed so as to be engage with the respective cylindrical cam pins.

Moreover, the imaging device 1 may be a single lens reflex camera of which lens is detachable or a compact camera of which lens is not detachable.

The lens barrel 11 includes the first, second, and third lens frames 39, 45, 55, but the number of lens frames is not limited to three.

The first, second, and third lens frame cam grooves 25, 27, 29 are formed in the cam frame 19, but the first lens frame cam grooves 25, the second lens frame cam grooves 27, and the third lens frame cam grooves 29 are formed in the first, second, and third cam frames, respectively, so that each cam frame is capable of being driven. In this way, the cam frames may be provided correspondingly to the respective cam grooves so as to be driven separately.

In addition, the numbers of lenses fitted to the first, second, and third lens frames 39, 45, 55 are not limited to the numbers each described above. As well, positive/negative refractive indices of the lenses fitted to the first, second, and third lens frames 39, 45, 55 are not limited to the above described combination.

The third lens frame cam grooves are intersected at the collapse parts thereof with the respective collapse parts of the first and second lens frame cam grooves in Embodiment 2, but the third lens frame cam grooves may be intersected at the variable powers thereof with the respective collapse parts of the first and second lens frame cam grooves, or may be intersected at the collapse parts thereof with the respective variable power parts of the first and second lens frame cam grooves. The third lens frame cam grooves may be intersected at any of the insertion parts, the collapse parts, and the variable power parts thereof with the first and second lens frame cam grooves, or the first and second lens frame cam grooves may be intersected at any of the respective insertion parts, the respective collapse parts, and the respective variable power parts thereof with the third lens frame cam grooves.

INDUSTRIAL APPLICABILITY

As described above, the present invention is useful for lens barrels and imaging devices. Particularly, the present invention is useful for lens barrels having a zooming function and imaging devices including the lens barrels.

The invention claimed is:

1. A lens barrel having a zooming function, comprising:
a cylindrical cam frame which is capable of moving along a direction of an optical axis and which includes an inner peripheral face in which a plurality of cam grooves are formed; and
a plurality of lens frames arranged inside the cam frame with a longitudinal direction thereof aligned with that of the cam frame,
wherein the plurality of lens frames are formed so as to receive lenses so that the lenses are arranged and mounted in the cam frame with optical axes thereof aligned with each other, and the plurality of lens frames include cam pins capable of being engaged with the plurality of cam grooves,
each of the plurality of cam grooves includes in a longitudinal direction thereof:
an insertion part formed so that a corresponding cam pin is movable in the longitudinal direction thereof while being engaged therewith when the plurality of lens frames are inserted in the cam frame;
a collapse part formed so that a corresponding cam pin is movable in the longitudinal direction thereof while being engaged therewith when the plurality of lens frames move in the direction of the optical axis; and
a variable power part formed so that a corresponding cam pin is movable in the longitudinal direction thereof while being engaged therewith when the plurality of lens frames are zoomed,
at least one cam groove out of the plurality of cam grooves are formed deeper than the other cam groove, and
in the collapse part of the relatively deep cam groove, which is formed deeper than the other cam groove, an intersection intersected with the insertion part of the other cam groove is formed.

2. The lens barrel of claim 1,
wherein the relatively deep cam groove is formed so that a corresponding cam pin moves with the tip end thereof engaged with the relatively deep cam groove and with no other part thereof engaged with the relatively deep cam groove at the intersection and in the vicinity of the intersection.

3. The lens barrel of claim 2,
wherein the cam pins are formed tapered as they go toward their tip ends, in the vicinity of the intersection, in cross section,
the relatively deep cam groove includes a step portion, and
a groove width of the relatively deep cam groove is wider than a pin width of the cam pins on an open side from the step portion while being substantially the same as the pin width of the cam pins on a groove bottom side from the step portion.

4. The lens barrel of claim 1,
wherein first, second, and third cam grooves are formed in the inner peripheral face of the cam frame, and
one of the first, second, and third cam grooves is the relatively deep cam groove.

5. An imaging device comprising the lens barrel of claim 1.

6. A lens barrel having a zooming function, comprising:
a cylindrical cam frame which is capable of moving along a direction of an optical axis and which includes an inner peripheral face in which a plurality of cam grooves are formed; and
a plurality of lens frames arranged inside the cam frame with a longitudinal direction thereof aligned with that of the cam frame,
wherein the plurality of lens frames are formed so as to receive lenses so that the lenses are arranged and mounted in the cam frame with optical axes thereof aligned with each other, and the plurality of lens frames include cam pins capable of being engaged with the plurality of cam grooves,
each of the plurality of cam grooves includes in a longitudinal direction thereof:
an insertion part formed so that a corresponding cam pin is movable in the longitudinal direction thereof while being engaged therewith when the plurality of lens frames are inserted in the cam frame;
a collapse part formed so that a corresponding cam pin is movable in the longitudinal direction thereof while being engaged therewith when the plurality of lens frames move in the direction of the optical axis; and
a variable power part formed so that a corresponding cam pin is movable in the longitudinal direction thereof while being engaged therewith when the plurality of lens frames are zoomed, at least one cam groove out of the plurality of cam grooves are formed deeper than the other cam groove, and the relatively deep cam groove, which is formed deeper than the other cam groove, includes an intersection intersected with the other cam groove and is formed so that a corresponding cam pin moves with the tip end thereof engaged with the relatively deep cam groove and with no other parts thereof engaged with the relatively deep cam groove at the intersection and in the vicinity of the intersection.

7. An imaging device comprising the lens barrel of claim 6.

* * * * *

UNITED STATES PATENT AND TRADEMARK OFFICE
CERTIFICATE OF CORRECTION

PATENT NO. : 7,620,306 B2  Page 1 of 1
APPLICATION NO. : 11/660314
DATED : November 17, 2009
INVENTOR(S) : Takeo Santo et al.

It is certified that error appears in the above-identified patent and that said Letters Patent is hereby corrected as shown below:

Title page, Item "(86) PCT No.:" please change
"PCT/JP2006/013949"
to
--PCT/JP2006/313949--.

Signed and Sealed this

Twenty-fifth Day of May, 2010

David J. Kappos
*Director of the United States Patent and Trademark Office*